INVENTOR.
JOHN T. FERRARIS
JOHN J. KOWALEWSKI
BY
ATTORNEY

INVENTORS
JOHN T. FERRARIS
JOHN J. KOWALEWSKI
BY
Thomas C. Betts
ATTORNEY

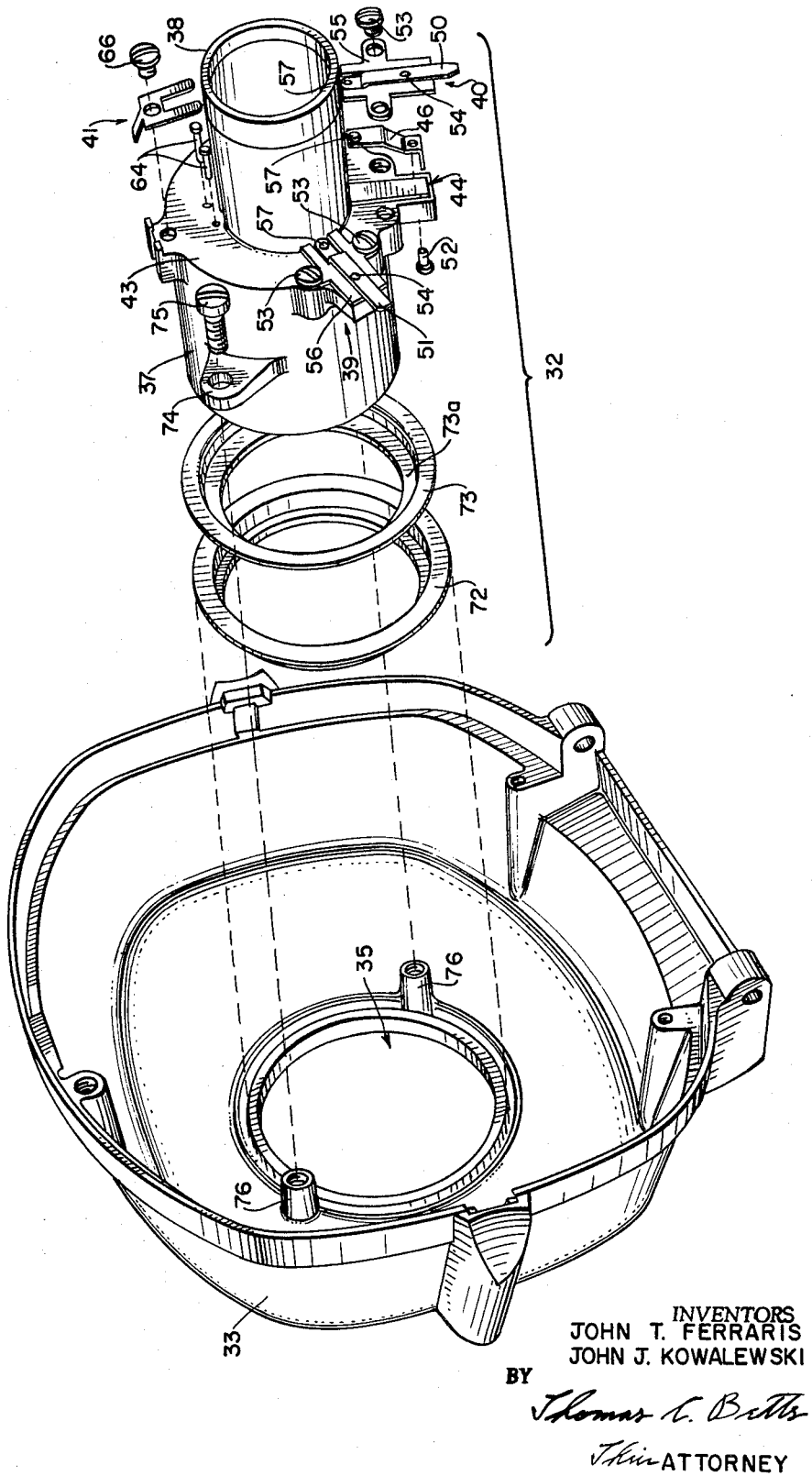

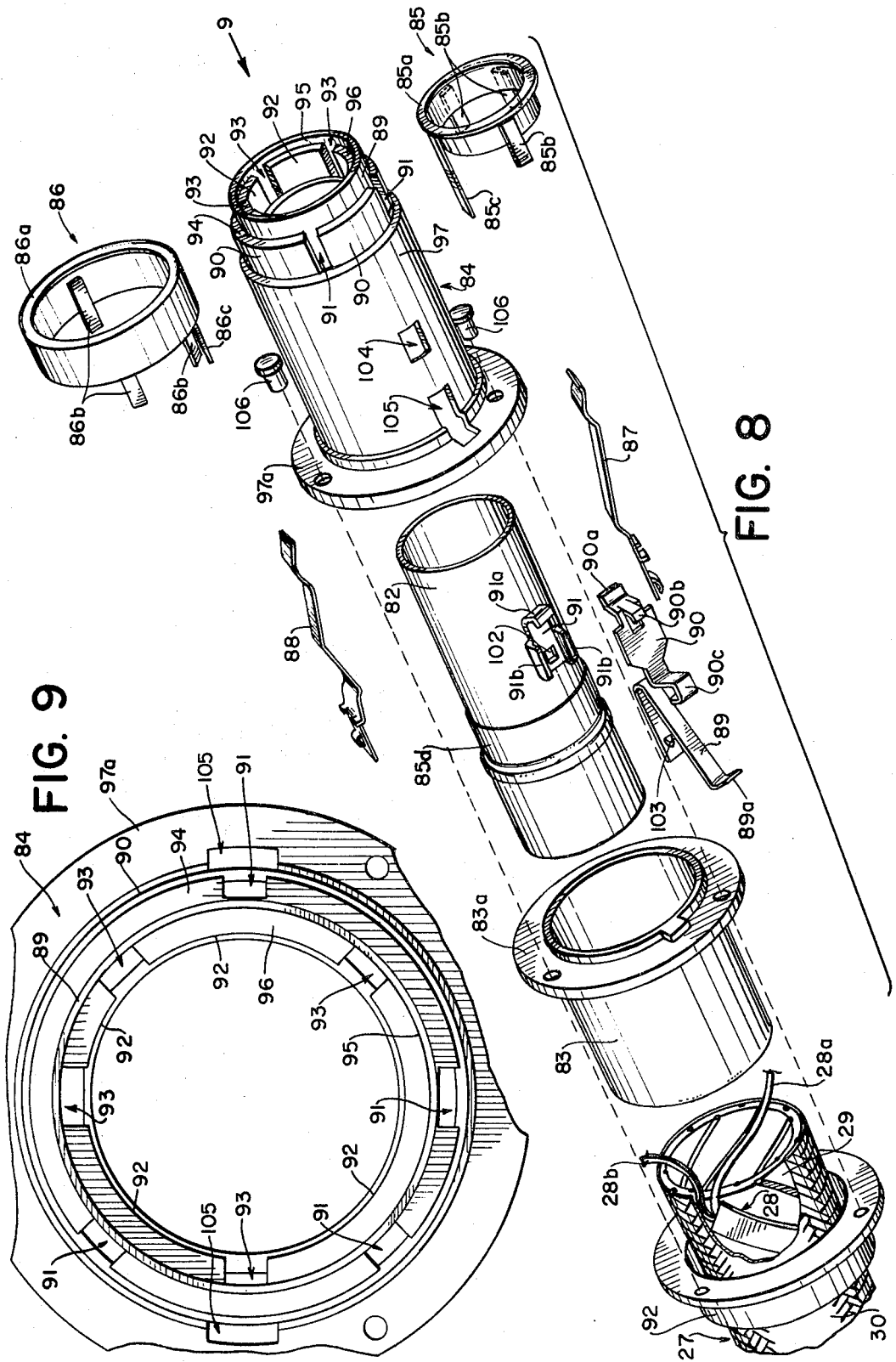

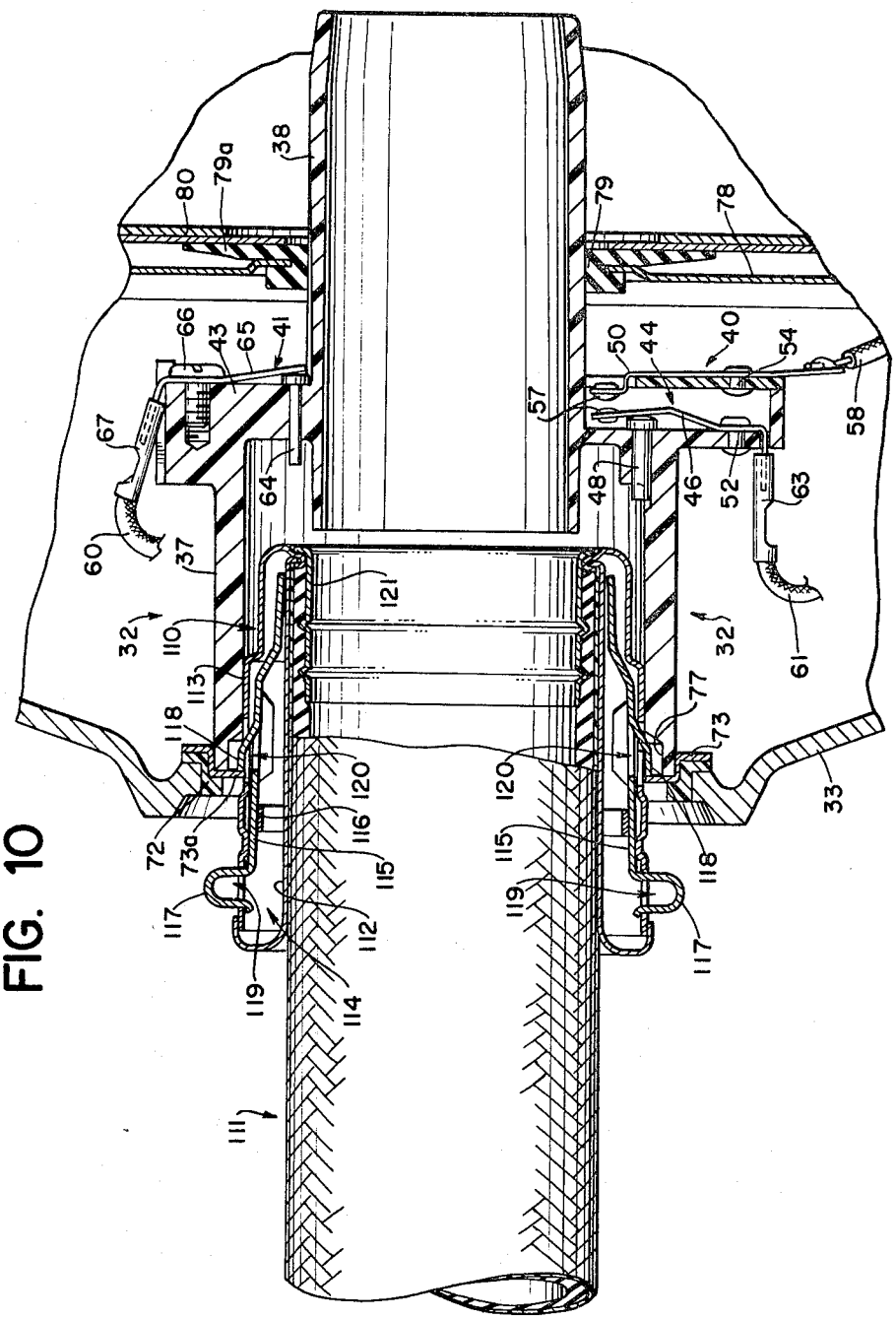

United States Patent Office 3,387,319
Patented June 11, 1968

3,387,319
AIRFLOW-ELECTRIC COUPLING FOR
VACUUM CLEANER
John T. Ferraris, Stamford, and John J. Kowalewski,
Riverside, Conn., assignors to Electrolux Corporation, Old Greenwich, Conn., a corporation of Delaware
Filed June 28, 1965, Ser. No. 467,634
9 Claims. (Cl. 15—327)

ABSTRACT OF THE DISCLOSURE

A coupling for connecting an air hose having integral electric conductors to a suction inlet of a vacuum cleaner for providing both an airflow, rotatable, sealed connection as well as an electrical connection therebetween. A hose end coupling member is connected to one end of the hose which is adapted to fit into a hollow receptacle member carried by the end piece of a vacuum cleaner tank. The extreme end of the hose coupling member is provided with a pair of coaxially arranged circular contacts or slip rings coupled to the hose conductors and a latch mechanism for holding the hose in the hollow receptacle member. The hollow receptacle member is included in the suction inlet of the vacuum cleaner which introduces dirt-ladened air to the cleaner filter. The receptacle member carries a pair of normally energized or live contacts in an inaccessible location relative to the suction inlet and an associated pair of normally open movable contacts each of which is coupled with a dielectric push rod extending into the suction inlet for engagement with the hose coupling whereby these contacts are closed. The movable contacts are electrically connected with receptacle contacts including a conductive push rod extending into the suction inlet which engage the slip rings of the hose end coupling thereby energizing the integral hose conductors without exposing "live" conductors which are accessible from the suction inlet when the hose is not inserted therein.

Our invention pertains, in general, to the cleaning of carpeted or rug covered surfaces by employing the effects of surface agitation and suction, simultaneously; and, in particular, to a coupling for effecting a sealed airflow connection between a conductor-carrying suction hose and the suction inlet opening of the tank unit of a vacuum cleaner while simultaneously energizing the hose conductors by means of electric contacts which are located in the region of the suction inlet opening.

For convenience, the coupling provided by the invention is often referred to hereinafter as an airflow-electric coupling.

It has been found that there results a more thorough cleaning of carpets and rugs, especially those made from synthetic materials, when they are simultaneously brushed and vacuumed. In performing such a cleaning operation, a flexible suction hose which carries electrical conductors applies suction, created in the tank unit of a vacuum cleaner, to a carpet cleaning nozzle. At the same time, the hose conducts electricity from the tank unit to a motor which, drives a carpet-agitating brush located in the cleaning nozzle. Much of the dust and dirt in the carpet is dislodged by brush rotation and conveyed by suction-induced airflow to a dust bag located in the tank unit. In addition, the rotating brush fluffs the carpet nap giving the carpet surface a neat appearance.

With the prior art cleaning equipment of the type hereinbefore described, a conventional airflow coupling at one end of the suction hose is used to connect the hose with the tank unit's suction inlet opening so that dirt-ladened air can flow through the hose and into the dust bag located in the tank unit. Also, in order to conduct electricity to the brush-rotating motor located in the cleaning nozzle, there is provided a separate electrical receptacle in the tank unit, at a relatively remote location from the suction inlet opening, and this receptacle is intended to receive a conventional male plug connected to one end of an electric cord which is carried lengthwise along the outer surface of the suction hose.

Although the prior art cleaning equipment, hereinbefore briefly described, cleans rugs and carpets very well, it is not entirely satisfactory because of the separate airflow and electrical connections which are required to be made preparatory to the actual cleaning operation. Generally speaking, the prior art vacuum cleaner arrangement involving the aforesaid separate connections is relatively unwieldy and it requires somewhat more than ordinary effort to set it up to prepare for the cleaning operation.

The prior art arrangement is relatively unwieldy because although the conventional airflow coupling, which is rigidly connected to the end of the hose, is intended to permit rotational movement of the hose when inserted in the suction inlet opening, such movement is, very limited because of the restraining nature of the electrical connection between the cord's male plug and the tank unit's receptacle. In order to provide an adequate degree of rotation between the hose and tank unit a relatively large amount of slack must be provided in the electric cord. As a rule, this is undesirable. For example, a long slack portion of the cord can get fouled in the tank unit's wheels or runners.

In addition more effort is required to set up the prior art equipment for the cleaning operation. For example, after connecting the airflow coupling with the suction inlet opening, the cord's male plug must then be inserted into the tank unit's receptacle, but because of its remote location on the tank unit requires additional handling of the tank unit to reposition it in order to enable access to the receptacle for the purpose of connecting the male plug therein.

Therefore, one object of our invention is to provide an airflow-electric coupling which effects a sealed airflow connection between a conductor-carrying suction hose and the suction inlet opening of a vacuum cleaner's tank unit while simultaneously connecting the hose's conductors to energized electrical contacts located in the tank unit.

Another object of our invention is to provide a safe airflow-electric coupling wherein electrical contacts, accessible from the tank unit's suction inlet opening, are electrically energized only when the hose is operatively associated with the suction inlet and are deenergized when the hose is disconnected from the suction inlet, thereby substantially eliminating a source of electric shock.

Another object of our invention is to provide an airflow-electric coupling which permits unlimited rotational movement of the hose about its longitudinal axis when the hose is being manipulated during the cleaning operation.

Another object of our invention is to incorporate electrical contact means in the region of the suction inlet opening of the vacuum cleaner tank unit in such a way that, if desired, a conventional end coupling of a non-electrical (i.e., conductorless) suction hose can be pluged into the suction inlet opening without making electrical contact with the contact means which are incorporated in said suction inlet opening.

An important object of our invention resides in preventing electrical arcing from occurring in a region where dirt or dust might be able to accumulate within the receptacle member. To this end the switch elements are located in the neighborhood of the suction inlet opening in the tank unit. However, these switch elements are remote from the dirt and dust carried by the dirt-ladened air entering the inlet opening so that any arcing takes place in a dust-free environment. Further, the contact elements of the suction inlet receptacle are never energized as the elements of the hose coupling are making contact therewith. Nor are they energized as the coupling's contact elements are breaking contact therewith. In the former case the switch elements close after the contact elements have made contact and in the latter case the switch elements open before the contact elements have broken contact. Thus, no electrical arcing takes place between the coupling's contact elements and the receptacle's contact elements.

Another important object of our invention resides in the construction and arrangement of the switch elements of the receptacle and the contact elements serially connected therewith. When the end coupling of the hose is not within the receptacle, the receptacle's contact elements, which are exposed and can be touched by a person putting his fingers into the receptacle, are not electrically energized because the switch elements are open. Electrically energized portions of the switch elements are inaccessible so that one cannot touch such portions. While the switch elements can be closed by the person's fingers when they are within the receptacle, it requires an extremely difficult manipulation to simultaneously manually close the contact elements. Thus, the possibility of receiving an electric shock is substantially eliminated.

Other objects as well as the various features and advantages of our invention will become apparent from the following description when considered in connection with the accompanying drawings which form a part of this specification and of which:

FIG. 7 is an exploded view of the hollow receptacle member including its integral suction inlet conduit together with the end cover of a vacuum cleaner tank unit;

FIG. 8 is an exploded view of the hollow end coupling;

FIG. 9 is an enlarged end view of a part of the hollow end coupling as viewed along the direction of the arrow 9 in FIG. 8; and, FIG. 10 is a cross-sectional view showing a conventional end coupling of a non-electrical, or conductorless, suction hose inserted within the suction inlet opening of a vacuum cleaner tank unit in which our hollow receptacle member is incorporated.

Figure 1:
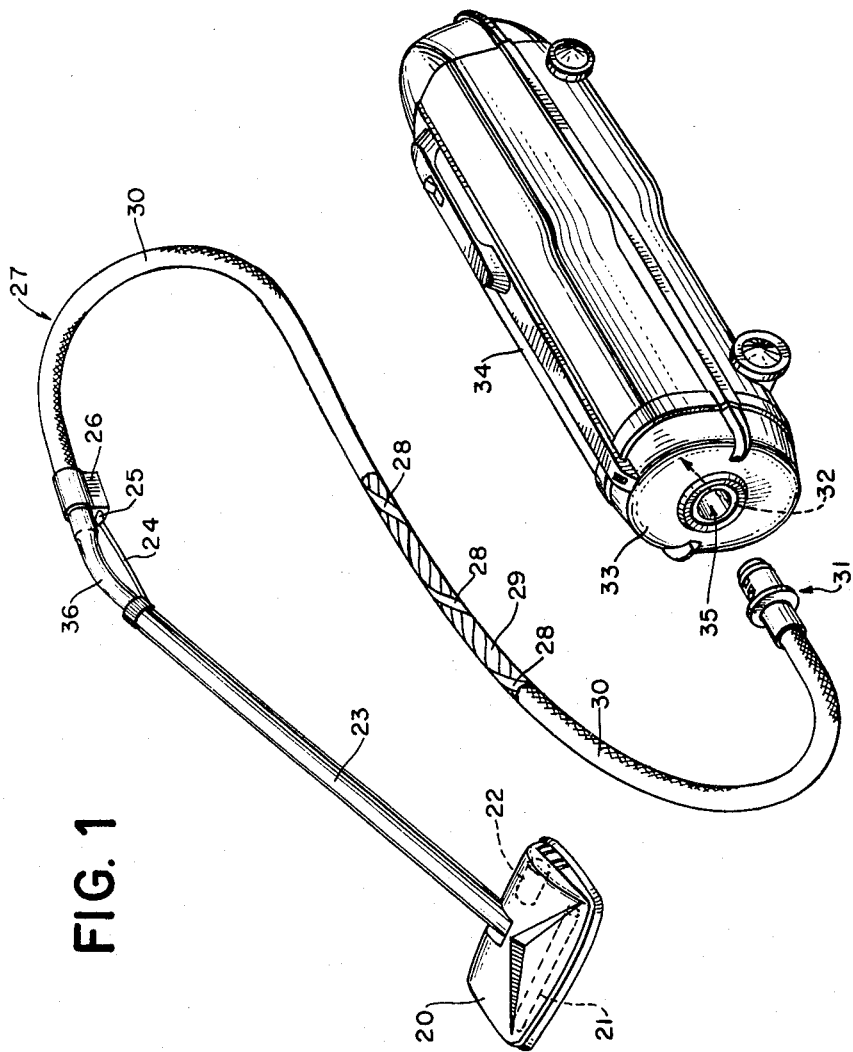
FIG. 1 is a perspective view of a tank type vacuum cleaner in which there is incorporated an airflow-electric coupling in accordance with one embodiment of our invention.

In FIG. 1 there is shown a rug cleaning suction nozzle 20 in which there is incorporated a surface agitating brush 21 which is rotated by an electric motor 22. Coupled to the nozzle 20 is a rigid hollow wand 23 in which there is included a separate small diameter conduit (not shown) through which an electric cord 24 passes. One end of the electric cord 24 is connected to the motor 22 and the other end of the cord 24 is terminated in a male plug 25. The male plug 25, as shown, is received by a female receptacle 26 which is secured to an end of a flexible suction hose 27 in which there is incorporated an insulated two-wire electrical conductor 28. This two-wire conductor 28 is flat or strip-like in form and is helically wound about the reinforced carcass 29 of the hose. Over the carcass 29 and the conductor 28 there is braided an outer protective sheath 30. At one end of the hose 30 there is a short rigid hollow handle 36 which, as shown in FIG. 1, is inserted into the upper end of the hollow wand 23. One end of each of the individual conductors of the two-wire conductor 28 is electrically connected to suitable contacts in the receptacle 26 while the opposite ends of these conductors are electrically connected to suitable electrical contacts carried by a hollow end coupling member 31.

Figure 2:
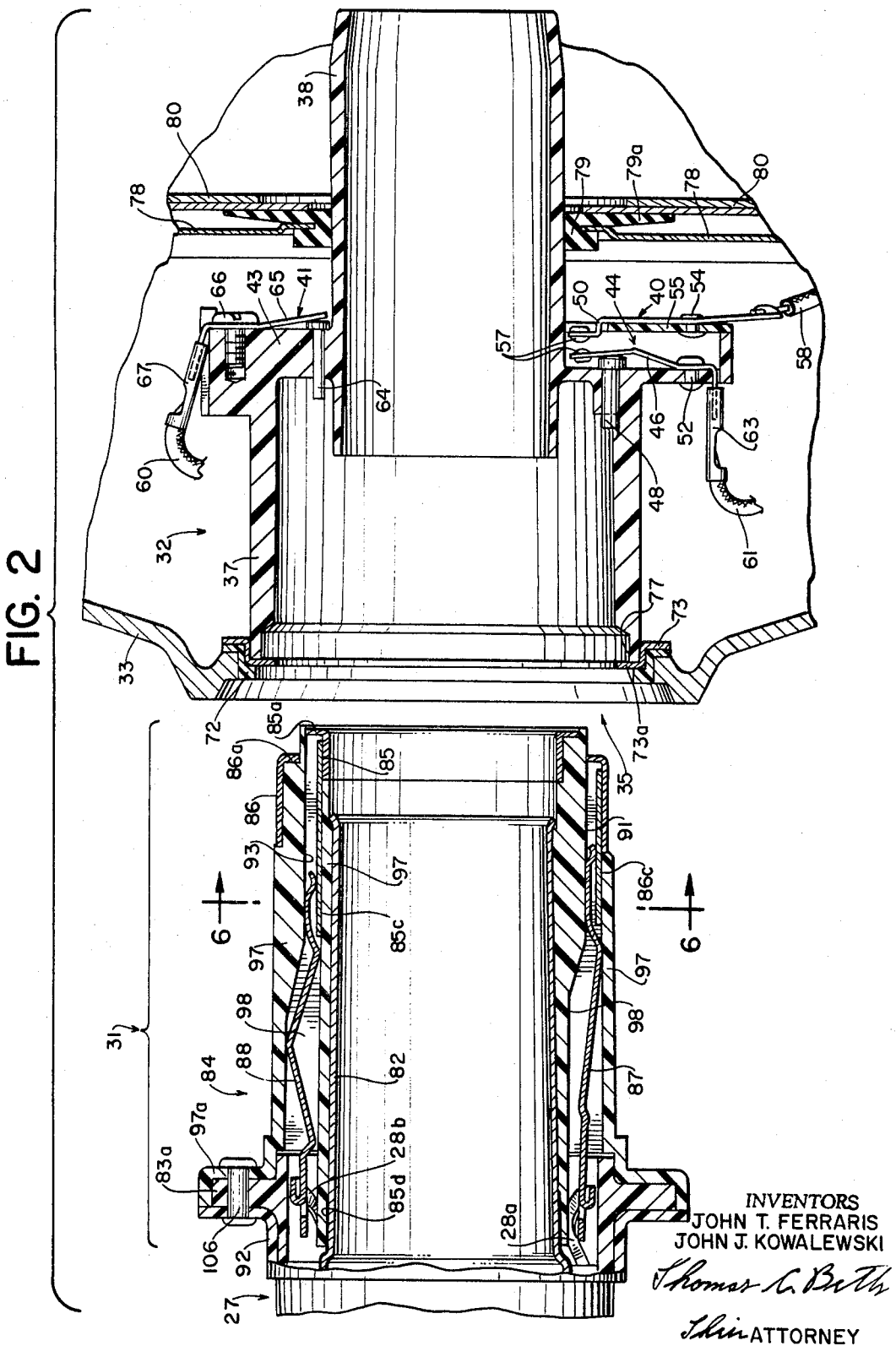
FIG. 2 is a cross-sectional view of a hollow end coupling and a hollow receptacle member which form our airflow-electric coupling, the end coupling being connected to an end of a suction hose and the receptacle member being located in the region of the suction inlet opening in the vacuum cleaner tank unit.
Figure 3:
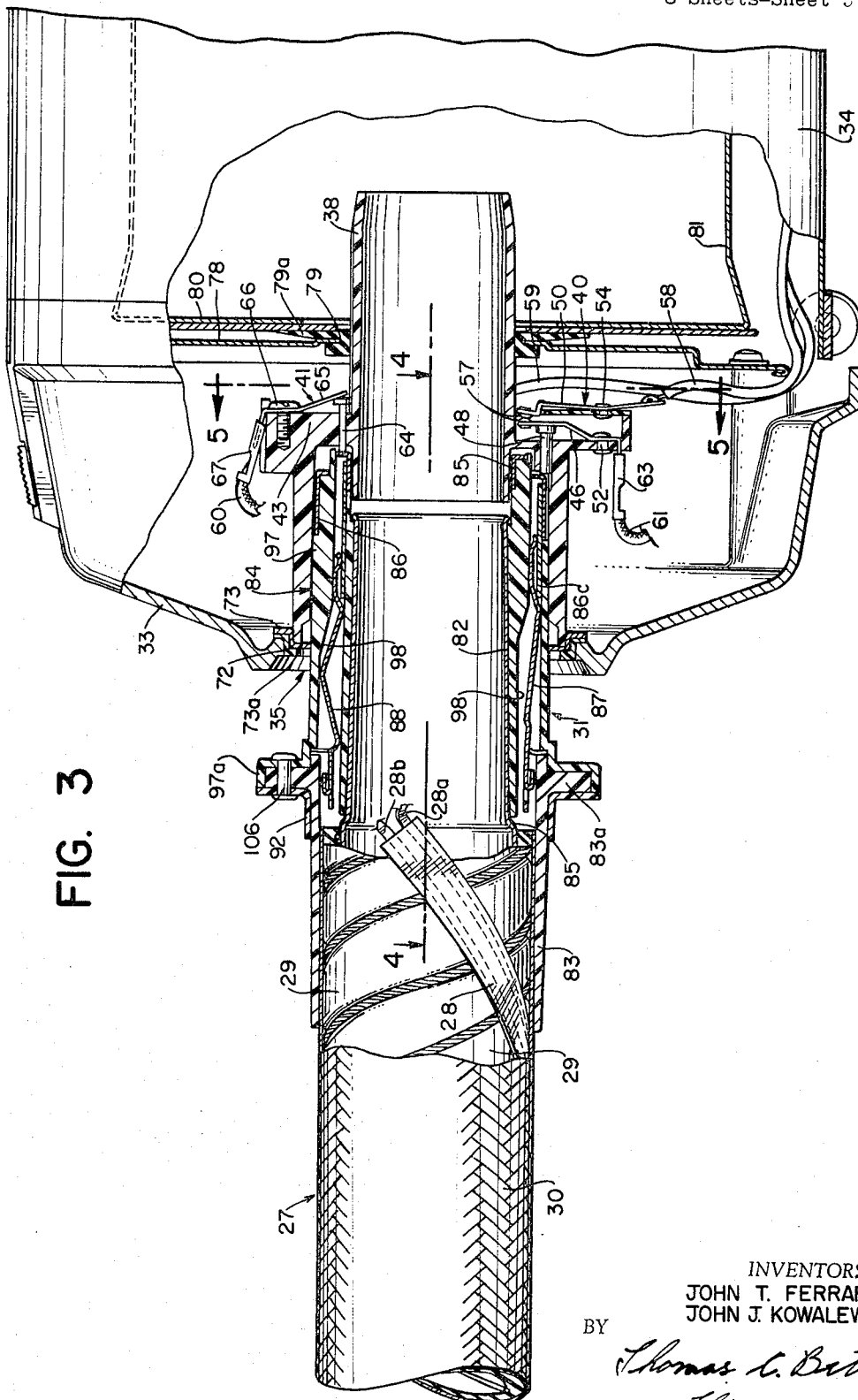
FIG. 3 is a cross-sectional view similar to that shown in FIG. 2 but showing the end coupling inserted in the suction inlet opening and being electrically energized by the receptacle member in the region of the suction inlet opening.
Figure 4:
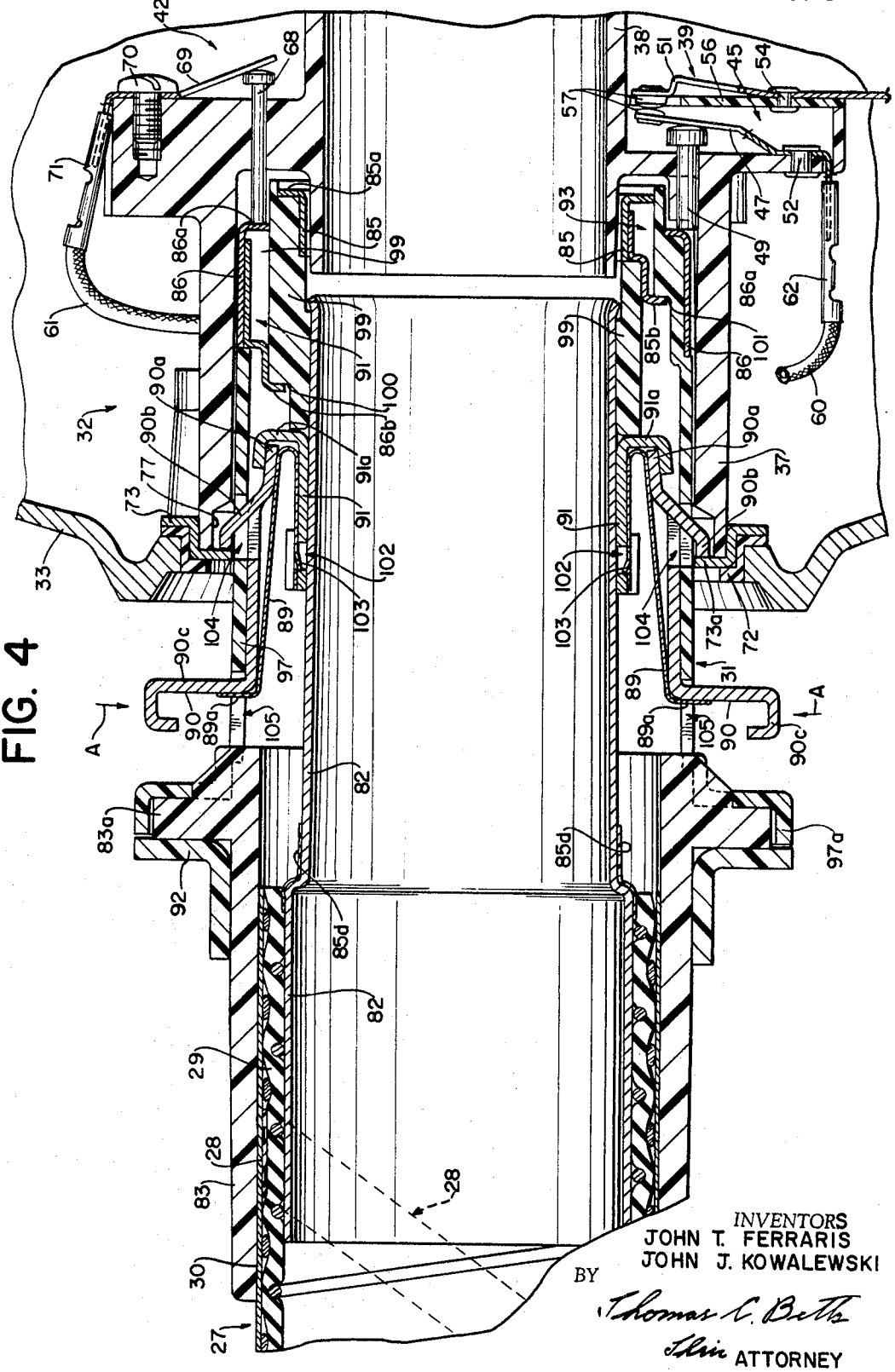
FIG. 4 is a somewhat enlarged cross-sectional view similar to that shown in FIG. 3 but viewed along the section lines 4—4 in FIG. 3.

The end coupling 31 together with a hollow receptacle member 32 (FIG. 2) which is incorporated in the suction inlet opening 35 defined in the end cover 33 of a vacuum cleaner tank unit 34 forms the airflow-electric coupling in accordance with our invention. FIG. 2 illustrates the end coupling 31 and the receptacle member 32 being separated while FIGS. 3 and 4 show the end coupling inserted within the receptacle. When, as shown in FIGS. 3 and 4, the end coupling 31 is inserted within the suction inlet opening 35 electrically energized contacts on the receptacle 32 energize contact means on the end coupling 31 thereby energizing the individual conductors of the two-wire conductor 28 and the electric cord 24, which cord 24 energizes the motor 22 to rotate the brush 21. As the brush 21 rotates and agitates the carpet surface it dislodges dirt, dust and lint therefrom and the dislodged matter is carried away by vacuum-induced airflow created in the tank 34 by a motor-fan unit. The airflow carries the dislodged matter through the nozzle 20, the wand 23, the rigid hose handle 36, the suction hose 27, the end coupling 31, the suction inlet opening 35 and, finally, into a suitable dust bag located in the tank unit 34.

In FIGS. 2–5 and 7 there is shown the hollow receptacle 32 of our invention together with the end cover 33 of the tank unit 34. As shown, the hollow receptacle 32 is comprised of: two integral coaxially-arranged hollow cylindrical bodies 37 and 38 of dielectric material, such as nylon or the like; two normally open single-pole single-throw switch assemblies 39 and 40; and two electrical contact assemblies 41 and 42.

The integral hollow cylindrical bodies 37 and 38 have different diameters, the body 37 having a larger diameter than the body 38. The hollow cylindrical body 38, which forms the suction inlet conduit of the receptacle 32, protrudes, as shown at FIG. 2, a short distance axially into the hollow duct defined within the hollow cylindrical body 37. Also, the cylindrical body 38 protrudes outwardly in the opposite direction for a substantial distance from an end wall 43 which joins the end sections of the two hollow bodies 37 and 38. This end wall 43 which has a relatively thick dimension (see FIG. 2) supports the two switch assemblies 39 and 40 as well as the two electrical contact assemblies 41 and 42.

Figure 5:
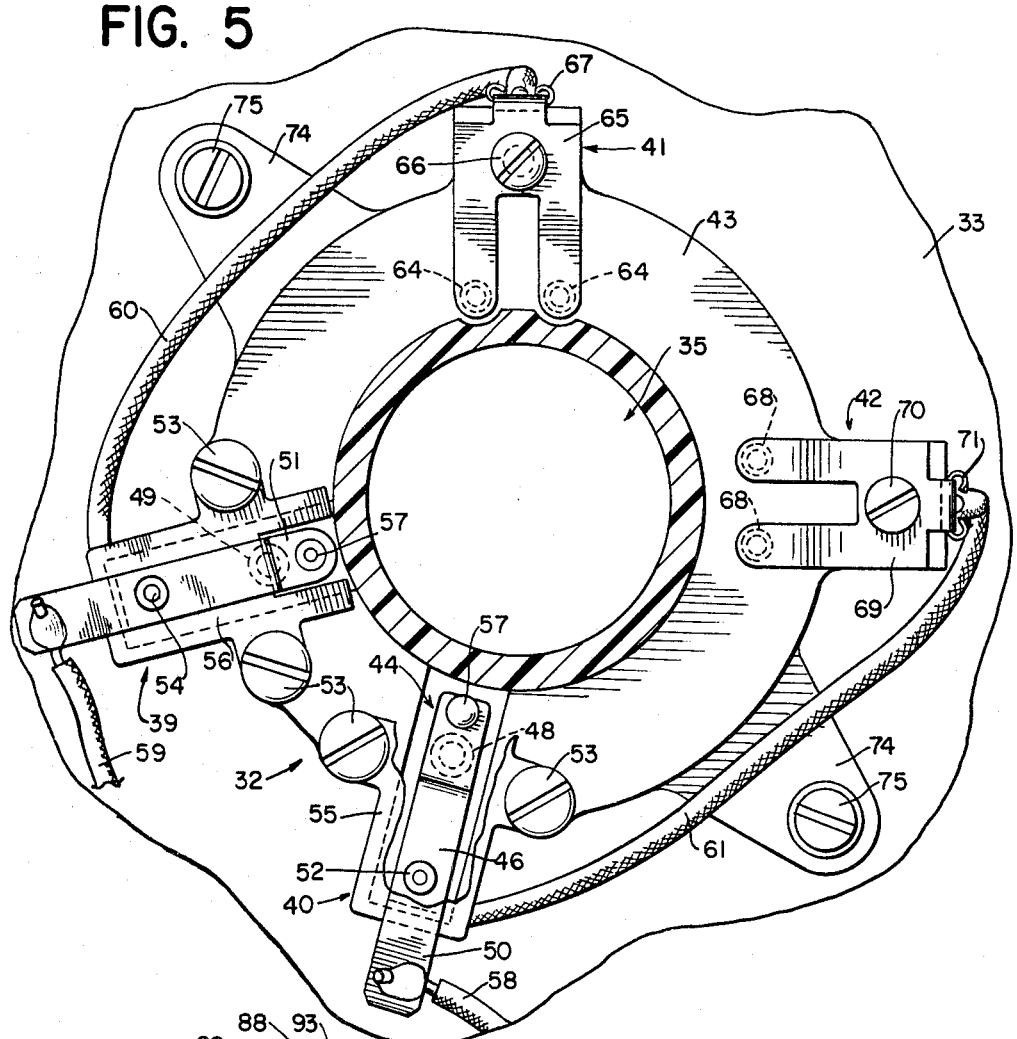
FIG. 5 is an enlarged cross-sectional view of the receptacle member as viewed along section lines 5—5 in FIG. 3.

Referring now to FIGS. 2, 4, 5 and 7, two cavities 44 and 45 are formed in the end wall 43 and these cavities house the leaf spring electrical contacts 46 and 47 of the switch assemblies 40 and 39, respectively. The end wall 43 is also provided with holes which extend from the cavities 44 and 45 to the hollow duct in the larger diameter cylindrical body 37. In these holes there are arranged the two push rods 48 and 49. These push rods are of a dielectric material, such as nylon or the like, and they are arranged for sliding movement within the aforesaid holes as can be understood from FIGS. 2, 3 and 4. The push rod 48 is intended to actuate the leaf spring contact 46 of the switch assembly 40 and the push rod 49 is intended to actuate the leaf spring contact 47 of the switch assembly 39. These push rods 48 and 49, in the manner hereinafter described, move the leaf spring contacts 46 and 47 into contact with complimentary leaf spring contacts 50 and 51, respectively, thereby causing closure of the switch assemblies 40 and 39. Rivets 52 are used to fasten the leaf spring contacts 46 and 47 to the end wall 43. As shown in FIG. 5, screws 53 fasten cover plates 55 and 56 of dielectric material (e.g., nylon or the like) over the cavities 44 and 45 to partially cover these cavities. Rivets 54 are used for fastening the leaf spring contacts 50 and 51 to the cover plates 55 and 56. Each of the leaf spring contacts 46, 50 and 47, 51 have contact buttons 57 of silver, or another suitable highly conductive material, fastened at the ends thereof. Since the cover plates 55 and 56 do not completely cover the cavities 44 and 45 the contact buttons 57 of the pairs of leaf spring contacts forming the switch assemblies 40 and 39 may make contact with each other (as shown in FIGS. 3 and 4) when the dielectric push rods 48 and 49 are moved from left to right. Soldered to the ends of the leaf spring contacts 50 and 51 are the conductors 58 and 59, respectively. These conductors are connected to electrically energized terminals (not shown) which are at different electrical potentials. These energized terminals are located elsewhere within the tank unit 34.

The switch assemblies 39 and 40 are electrically connected in series through the conductors 60 and 61 with the electrical contact assemblies 41 and 42, respectively. One end of the conductor 60 is connected by an electrical connector 62 to the leaf spring contact 47. Similarly, one end of the conductor 61 is connected by an electrical connector 63 to the leaf spring contact 46.

The contact assembly 41 includes a pair of pin-type electrical contacts 64 which extend through a pair of holes provided in the end wall 43. These pin-type contacts 64 may be moved longitudinally within the holes as indicated in FIGS. 2 and 3. A bifurcated leaf spring electrical contact element 65 is fastened to the end wall 43 by means of a screw 66 and this bifurcated leaf spring 65 bears against the enlarged heads of both of the electrical contacts 64 thereby resiliently mounting these contacts within their respective holes provided in the end wall 43. An electrical connector 67 is provided for connecting one end of the conductor 60 to the bifurcated leaf spring electrical contact 65.

Similarly the contact assembly 42 includes a pair of pin-type electrical contacts 68 which extend through a pair of holes provided through the end wall 43. These pin-type contacts 68 may also be moved longitudinally within their respective holes. A bifurcated leaf spring electrical contact element 69 is fastened to the end wall 43 by means of the screw 70. The bifurcated leaf spring contact 69 also bears against the enlarged heads of the electrical contacts 68 to resiliently mount these contacts within their respective holes. An electrical connector 71 connects the end of the conductor 61 to the bifurcated leaf spring element 69.

The leaf spring contact elements 46, 50 and 47, 51, and 65, 69 as well as the pairs of pin-type contacts 64 and 68 may be made from a stiff resilient electrically conductive material, such as beryllium copper, phosphor bronze or the like.

As shown in FIGS. 2 and 7 a ring 72 of dielectric material, such as nylon, polyethylene or the like, is inserted into the opening 35 in the end cover 33. Another ring 73 which may be made of a metallic material, such as steel or the like, is assembled with the dielectric ring 72 in the way shown so that the dielectric ring 72 insulates the metallic ring 73 from the metallic end cover 33. The cross-sectional shapes of the rings 72 and 73 are, as shown in FIG. 2, such that the metallic ring 73 fits within or is nested in the dielectric ring 72. The metallic ring 73 has an integral annular rim 73a which together with an annular groove 77 formed in the inside surface of the hollow cylindrical body 37 is instrumental, in the manner hereinafter described, in enabling the hollow end coupling 31 to be detachably coupled with the hollow receptacle 32.

In order to secure the receptacle 32 within the end cover 33, the hollow cylindrical body 37 has a pair of mounting ears 74 integral therewith and extending from opposite sides thereof. Each of these ears is provided with a hole for receiving a mounting screw 75. The screws 75 pass through the aforesaid holes in the ears 74 and are received within the internally threaded bosses 76 (FIG. 7) which are formed in the inside of the end cover 33.

As shown in FIGS. 2 and 3 there is assembled in the end cover 33 a rigid cover plate 78 which may be made of steel or the like. The cover plate 78 has a large diameter aperture in the center thereof. Into this aperture an annular seal 79 of rubber or the like is snap-fitted so as to positively secure the seal to the cover plate 78 as shown. The annular seal 79 tightly encompasses the outside of the cylindrical body 38 (or suction inlet conduit). On one face of the annular seal 79 there is formed a wide annular flange 79a which is intended to provide a wide area sealing surface between a face of the flange 79a and a stiff end cover 80 of a disposable paper dust bag 81. The end cover 80 of the dust bag is, as shown, formed of two plies of cardboard. The rigid cover plate 78 is fastened, by means not shown, to the inside surface of the end cover 33. As indicated the cylindrical body 38 (suction inlet conduit) protrudes into the dust bag 81 through a central opening provided in the dust bag's end cover 80.

In FIGS. 2, 3, 4, 6 and 8 hollow end coupling 31 is shown in detail. The end coupling 31 is comprised of: a rigid hollow tubular member 82 of steel or the like which has on the outside surface thereof a narrow insulating film 85d which may be a single layer of electrical insulating tape; a flanged tubular handle member 83 of a dielectric material, such as vinyl plastic or the like; a hollow cylinder-like body 84 of a dielectric material, such as nylon or the like; a smaller diameter slip ring contact 85 of dielectrically conductive material, such as copper; a large diameter slip ring contact 86 of electrically conductive material, such as copper or the like; a pair of resilient blade-like contact elements 87 and 88 of electrically conductive material, such as beryllium copper, phosphor bronze or the like; a pair of spring biased latch assemblies, each of which, as shown at FIGS. 4 and 8, are comprised of a leaf spring 89, an actuating lever 90 and a mounting bracket 91 which is fastened to the outside surface of the rigid tubular member 82; and a flanged ring 92 of rigid material, such as nylon or the like, which is intended to be coupled with the flanged tubular handle member 83 and the cylinder-like body 84. The leaf springs 89, the actuating levers 90 and the mounting brackets 91 may be fashioned from steel or the like.

One way of assembling the various elements of the end coupling 31 with the suction hose 27 is as follows:

First, a short length of the insulated conductor 28 is drawn out from between the hose carcass 29 and the braided sheath 30 and extended a short distance beyond the end of the hose 27. Then the flanged ring 92 and the flanged tubular handle member 83 are slipped over the suction hose 27 and temporarily located a relatively great distance from the end of the suction hose. These are the last elements to be assembled to complete the coupling. The rigid tubular member 82 which is initially of a constant outside diameter, smaller than the hose's inside diameter, and not of two different diameters, as shown in FIG 8, is inserted into the end of the suction hose 27. Then a tool suitable for the purpose is used to expand that section of the tubular member 82 which is inside the hose against the hose carcass 29 so that a relatively high pressure contact exists between the carcass 29 and the tubular member 82. As a result of the tight fit achieved by the expansion, the tubular member 82 is firmly secured to the end of the suction hose 27.

Then, the insulating material is stripped from an end portion of the conductor 28 to bare a short length of each of the two conductive strips 28a and 28b. The ends of these conductive strips are electrically connected to the ends of the resilient contact blades 87 and 88. This connection may be made by crimping and soldering the ends of the conductive strips 28a and 28b to lugs which are provided on the end of the contact blades 87 and 88. In the completely assembled coupling 31, as shown at FIG. 2, the conductive strips 28a and 28b are insulated from the metallic tubular member 82 by the electrical insulating tape 85d.

Next, the two annular slip ring contacts 85 and 86 are assembled with the cylinder-like body 84. As shown, the smaller diameter slip ring contact 85 is provided with an annular contact surface 85a which is ultimately intended to make electrical contact with the pin-type contacts 64 in the receptacle 32. The slip ring contact 85 is also provided with three relatively short axially projecting tabs 85b and a long axially projecting tab 85c. The short tabs 85b are for the purpose of securing the slip ring contact 85 to the cylinder-like body 84 and the longer projecting tab 85c is for the purpose of making electrical contact with the resilient blade contact 88. Similarly, the larger diameter slip ring contact 86 has an annular contact surface 86a which is ultimately intended to make contact with the pin-type contacts 68 in the receptacle 32. The larger diameter slip ring contact 86 is also provided with three short axially projecting tabs 86b and a longer axially projecting tab 86c. The short tabs 86b are for the purpose of securing the ring contact 86 to the cylinder-like body 84 and the larger tab 86c is for the purpose of making electrical contact with the resilient blade contact 87.

Figure 6:
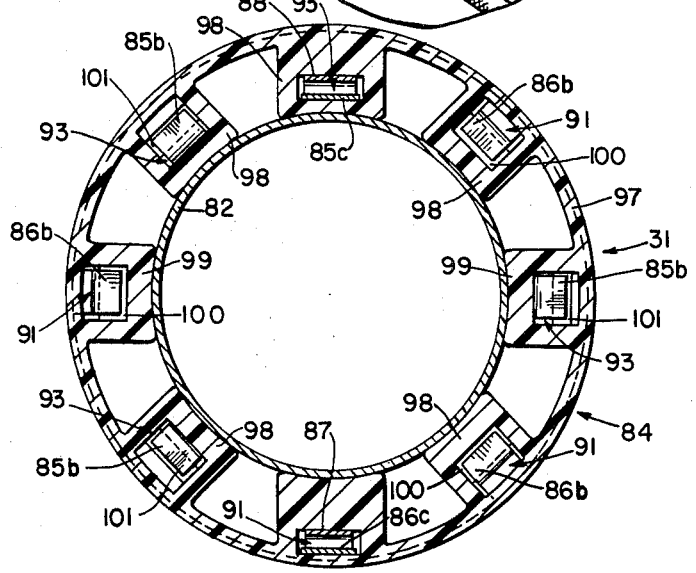
FIG. 6 is an enlarged sectional view of the end coupling as viewed along the section lines 6—6 in FIG. 2.

For the purpose of arranging the slip ring contacts 85 and 86 concentrically on the front end of the hollow cylinder-like body 84, the body 84 has formed in its outside surface two annular lands 89 and 90. The annular land 90 is segmented by the four short axial slots 91 cut therein. As shown in FIGS. 6 and 9, the slots 91 communicate with the inside of the hollow cylinder-like body 84. Formed in the inside surface of the hollow cylinder-like body is an annular land 95 and a segmented annular land 92. Between the segments forming the annular land 92 are four short axial slots 93 and, as shown in FIGS. 6 and 9, these slots also communicate with the inside of the cylinder-like body 84.

The larger diameter slip ring contact 86 is slipped over the front end of the body 84 so that the inside surface of ring contact 86 is in contact with the surface of the segmented land 90 with each of the three projecting tabs 86b and the tab 86c lying in a different one of the axial slots 91. Also, as shown in FIG. 2, the inwardly turned rim forming the annular contact surface 86a covers the shoulder 94, which shoulder is defined between the lands 89 and 90.

Similarly, the smaller diameter slip ring contact 85 is inserted into the front end of the cylinder-like body 84 so that the outside surface of ring contact 85 is in contact with the surface of the segmented land 92 with each of the three projecting tabs 85b and the tab 85c lying in a different one of the axial slots 93. Also, as shown in FIG. 2, the inwardly turned rim forming the annular contact surface 85a covers a shoulder 96 defined between the lands 92 and 95.

FIGS. 2, 4, 6 and 9 show the internal details of the cylinder-like body 84. As shown, each of the axial slots 91 and 93 enters the body 84 and communicates with longitudinal channels internally defined between an outer wall 97 of the body 84 and the internal U-shaped wall members 98 and 99. As shown in FIG. 2, the U-shaped wall members 98 extend for a substantial distance axially while the U-shaped wall members 99 extend for but a short distance axially (see FIG. 4). The U-shaped wall members 99 are relatively short so that as shown in FIG. 4 the latch mechanism can be fitted within the cylinder-like body 84. These U-shaped internal wall members 98 and 99 are integral with the outer wall 97 and close the internal longitudinal channels on four sides. The front end of each internal channel which communicates with a slot 91 is closed by that part of the ring contact 86 which is inwardly turned to form the contact surface 86a. Similarly, the front end of each internal channel which communicates with a slot 93 is closed by that part of the ring contact 85 which is outwardly turned to form the contact surface 85a. However, as shown in FIGS. 2 and 4 the opposite or rear end of the internal channels or compartments are open. As shown in FIGS. 4 and 6, in three of the channels which communicate with the slots 91 there is provided a shoulder 100 and in three of the channels which communicate with the slots 93 there is provided the shoulder 101. The three channels having the shoulders 100 contain the projecting tabs 86b while the three channels having the shoulder 101 contain the projecting tabs 85b. The projecting tabs 85b are bent over at right angles to bear against the shoulders 101 and the projecting tabs 86b are bent over at right angles against the shoulders 100. This is done for the purpose of positively securing the ring contacts 85 and 86 to the cylinder-like body 84.

After securing the ring contacts 85 and 86 to the cylinder-like body 84 the rigid hollow tubular member 82 on the end of the hose 27 may be inserted into the central opening in the cylinder-like body 84. The tubular member 82 is inserted in such a manner that the mounting brackets 91 on the outside of the tubular member 82 abut against the short internal wall members 99 which, as shown in FIG. 4, are disposed on opposite sides of the inside of the cylinder-like body 84.

As shown in FIGS. 2, 3 and 6 the contact blades 87 and 88 are inserted into separate longitudinal channels which are disposed in diametrically opposite sides within the cylinder-like body 84. The contact blade 87 makes contact with the projecting tab 86c of the slip ring contact 86 and the contact blade 88 makes contact with the projecting tab 85c of the slip ring contact 85.

A suitable tool, such as long nose pliers, may be used to insert the V-like bent springs 89 of the actuating levers 90 within the cylinder-like body 84. As indicated in FIG. 4 each actuating lever 90 is superimposed over a bent spring 89 and this superimposed assembly is inserted with the aid of the pliers from the rear end of the body 84 and moved toward the front end of the body 84. During this forward movement the two legs of the V-like spring 89 are forced toward each other so that the superimposed assembly of the spring and actuating lever can move without obsruction into the body 84. Eventually, the V-like spring 89 passes between two ears 91b provided on the mounting bracket 91 and the bight portion of the bent spring 89 and a nose 90a of the actuating lever 90 come into abutment with an outwardly projecting leg 91a which is provided on the mounting bracket 91. Also, a projecting tab 103 provided on one leg of the spring 89 enters a hole 102 which is formed in the mounting bracket 91. The projecting tab 103 and the hole 102 cooperate to prevent the spring 89 from moving in an axial direction toward the rear of the body 84. The two ears 91b prevent sidewise movement of the spring 89. Also, as shown at FIG. 4, the springs 89 are provided with outwardly extending leg portions 89a which bear against the back of an outwardly extending leg 90c which is formed in the actuating lever 90. Thus, the leg portions 89a prevent the actuating levers 90 from moving in an axial direction toward the rear of the cylinder-like body 84.

Two pairs of holes 104 and 105 are provided in the outer wall 97 of the cylinder-like body. (See FIGS. 4 and 8.) The outwardly extending leg 90c of the actuating lever 90 projects through the hole 105, while another projecting tab 90b formed in the actuating lever 90 projects through the hole 104. Normally, when the coupling 31 is within the receptacle 32 as shown in FIG. 4, the bent V-like leaf springs 89 bias the actuating levers 90 so that the projecting tabs 90b extend through the holes 104 and into the internal annular groove 77 of the receptacle's hollow cylindrical member 37. The projecting tab 90b, when in the annular groove 77, engages the rim 73a of the annular ring 73. As a result, the coupling 31 is latched against axial withdrawal from the receptacle 32. However, the coupling 31 is free to rotate about its longitudinal central axis while it is within the receptacle 32.

To unlatch the coupling 31, for the purpose of withdrawing it from the receptacle 32, the outwardly projecting legs 90c of the actuating levers 90 are manually forced inwardly against the restraint of the springs 89 in the directions indicated by the arrows A (FIG. 4). When this is done both the legs 90c and the tabs 90b move inwardly through the holes 105 and 104, respectively, thereby withdrawing the tabs 90b from within the grooves 77 and disengaging these tabs from the rim 73a. With the legs 90c maintained in the aforesaid inward position, the coupling 31 may be withdrawn axially from the receptacle 32.

In order to complete the assembly of the coupling 31 the flanged tubular handle 83 is moved to the end of the hose 27 where it concentrically encompasses: the braided sheath 30; the reinforced carcass 29; the conductor 28, which is between the sheath and the carcass; and the rigid tubular member 82. As shown, the flange 83a at the end of the tubular handle member 83 is received within, or mates with, the flange 97a at the end of the cylinder-like body 84. Then, the flanged locking ring 92 is moved over the outside surface of the handle member 83 until it bears against a face of the flange 83a. The flanges 83a, 97a and the flange on the end of the locking ring 92 are provided with registering holes; for example, three holes spaced at about 120° circumferentially around the flanges. The rivets 106 are passed through these registering holes and they fasten the handle member 83, the locking ring 92 and the cylinder-like body 84 together.

The manner in which the coupling 31 and the receptacle member 32 are coupled to form our airflow-electric coupling between the conductor-carrying hose 27 and the tank unit 34 is as follows:

Assume that the coupling 31 is initially detached from the receptacle member 32. As shown in FIG. 2, the pairs of pin-type contacts 64 and 68 are not electrically energized because the dielectric push rods 48 and 49, being in the position indicated, do not close the normally open switch assemblies 40 and 39, respectively, which are in series with the contact assemblies 42 and 41, which contact assemblies include the pairs of pin-type contact elements 68 and 64. In order to insert the coupling 31 within the receptacle member 32, both legs 90c of the actuating lever 90 are moved inwardly in the direction indicated by the arrows A (see FIG. 4) and with these legs so held the plug is inserted into the suction inlet opening 35 and slidably moved toward the suction inlet conduit 38. Ultimately, as shown in FIGS. 3 and 4, the annular contact surface 86a of the outermost slip ring contact 86 comes into contact with both of the dieelectric push rods 48 and 49 and these push rods are moved axially against the restraint of the leaf spring contact elements 46 and 47 of the switch assemblies 40 and 39, respectively. However, before the contact buttons 57 on the leaf spring elements 46 and 57 make contact with the contact buttons 57 on the leaf spring elements 50 and 51 to cause closure of the switch assemblies 40 and 39, the annular contact surface 86a contacts the pin-type contacts 68 and the annular contact surface 85a contacts the pin-type concontacts 64.

An important feature of our invention lies in the fact that the contact surfaces 85a and 86a make contact with the pairs of contacts 64 and 68 before closure of the switch assemblies 40 and 39 occurs. The reason for this is that any arcing which might take place wlil occur in the switch assemblies 40 and 39, rather than between the annular contact surfaces 85a, 86a and the pintype contacts 64, 68, respectively. Since it is possible for dust and dirt to accumulate on the pin-type contacts 64 and 68 as well as on the annular contact surfaces 85a and 86a, it is better to avoid arcing in this area when an electrical contact is established or broken. The switch assemblies 40 and 39 are located on the dirt free side of the receptacle's wall portion 43 and, in addition, the leaf spring contacts which form the switch assemblies 40 and 39 are well confined within the covered cavities 44 and 45. Thus, any arcing which occurs whenever these spring contacts are connected or interrupted occurs in a dirt and dust free region.

When the coupling 31 is fully within the receptacle 32, as shown in FIGS. 3 and 4, the legs 90c of the actuating lever 90 are released and the plug member 31 becomes latched within the receptacle 32 in the manner hereinbefore described. As shown the switch assemblies 40 and 39 energize the pin-type contacts 68 and 64 which are connected in series with the aforesaid switch assemblies. The pin-type contacts 68 and 64, in turn, energize the annular slip ring contact surfaces 86a and 85a. Also, the projecting tabs 86c and 85c energize the contact blades 87 and 88 and these blades energize the conductors 28a and 28b in the hose.

The bifurcated leaf spring contacts 69 and 65 constantly urge the pairs of pin-type contacts 68 and 64 against the annular contact surfaces 86a and 85a so that there is a continuous electrical contact between these surfaces and pin-type contacts even though the coupling 31 may be rotating within the receptacle 32 due to the manipulation of the hose during the rug cleaning operation.

When it is desired to withdraw the coupling 31 from the receptacle the two projecting legs 90c are moved inwardly in the direction of the arrows A to unlatch the coupling. As the coupling is being withdrawn from the receptacle the switch assemblies 40 and 39 open before the pin-type contacts 68 and 64 break contact with the annular contact surfaces 86a and 85a. Even though the contact surfaces 85a and 86a are moving toward the left, in accordance with the orientation shown in FIGS. 3 and 4, as the coupling 31 is being withdrawn, the bifurcated leaf spring contacts 65 and 69 continue to urge the pin-type contacts 64 and 68 into contact with the annular contact surfaces 85a and 86a. Such contact is maintained until after the switch assemblies 39 and 40 open. As a result, any arcing which will tend to occur on deenergization occurs on the dust free side of the wall portion 43 and within the covered cavities 45 and 44. Advantageously, electrical arcing is avoided in the region of the pin-type contacts 64 and 68.

Another feature of our invention resides in the fact that it would require an extremely difficult manipulation to receive an electric shock if a person were to put his fingers into the receptacle when the hose's end coupling 31 is not within the receptacle. This is so because the person would have to put his fingers into the relatively small annular space between the cylindrical bodies 37 and 38 and actuate the dielectric push rods while, at the same time, touching the pin-type contacts.

Another feature of our invention is that our receptacle 32 is adapted to receive a conventional end coupling connected to the end of a non-electric or conductorless suction hose without there being any electrical contact between the contacts in the receptacle 32 and said conventional end coupling. One such conventional hose and coupling of the prior art is described in U.S. Patent No. 2,102,802.

In FIG. 10 there is shown a conventional hose end coupling 110 similar to that described in the above-identified patent. The end coupling 110 is connected to the end of a conductorless suction hose 111 and the coupling 110 is shown inserted in our receptacle 32. The coupling 110 is provided with an inner tubular wall member 112 and an outer tubular wall member 113. Between these wall members there is a long annular space 114 in which there is located two latch members 115, or actuating levers, and a spring 116 in the form of a band. The spring 116 normally biases both of the actuating levers 115 outwardly against the wall member 113 so that the U-shaped projections 117 and the projecting tabs 118 formed in the levers 115 protrude through the openings 119 and 120, which openings are formed in the outer wall member 113. A ferrule 121 is inserted in the hose coupling 110 and crimped over the inside surface of the hose 111 with the hose 111 being compressed between the outside surface of the ferrule 121 and the inside surface of the inner wall member 112.

The U-shaped projections 117 of the coupling 110 serve the same purpose as the outwardly extending legs 90c in the plug member 31 hereinbefore described. Similarly, the projecting tabs 118 of the coupling 110 serve the same purpose as the projecting tabs 90b on the coupling 31 of our invention. As shown in FIG. 10, the projecting tabs 118, when the coupling 110 is within the receptacle 32, extend through the opening 120 in the outside wall member 113 and into the internal annular groove 77 where the tabs 118 then abut against the rim 73a to positively latch the coupling 110 against movement in an axial direction. However, the coupling 110 may rotate within the receptacle 32 as the hose is being manipulated during the rug cleaning operation. As indicated the front end of the coupling 110 does not come into contact with the front of the suction inlet conduit 38 and it does not actuate the dielectric push rods 48 or 49. Even if the coupling 110 were to be forced further into the receptacle 32 its front end would abut against the front end of the suction inlet conduit 38, but the coupling 110 would still not actuate either of the push rods 48 or 49.

Withdrawal of the coupling 110 is accomplished by moving the U-shaped projections 117 inwardly so that the projecting tabs 118 will move into the space 114 through the openings 120, at which point the coupling 110 may be easily withdrawn from the receptacle 32.

While we have shown a more or less specific embodiment of our invention, it is to be understood that this has been done for purposes of illustration only and that the scope of our invention is not to be limited thereby, but is to be determined from the appended claims.

What we claim is:

1. An airflow-electric coupling comprising a receptacle member defining a suction inlet opening, contact means connected with said receptacle member, said contact means having a portion extending into said inlet opening, normally open switch means including a voltage source connected with said receptacle member remote from said inlet opening, movable plunger means consisting of dielectric material coupled with said switch means for closing said switch means in one position thereof, said plunger means having a portion extending into said inlet opening, and circuit means interconnecting said switch and contact means; whereby a discrete hose end-coupling inserted in said receptacle member moves said plunger into said one position for energizing said circuit and the contact means associated therewith, and hose end coupling contacts carried by said hose end-coupling to engage said portion of said contact means extending into said inlet opening for connection with said voltage source.

2. An airflow-electric coupling according to claim 1 wherein said portion of said contact means extending into said inlet opening comprises a second movable plunger means consisting of electrically conductive material, said second plunger means being coupled with said contact means at a location remote from said inlet opening.

3. An airflow-electric coupling according to claim 2 wherein said hose end coupling comprises a generally cup-like member attached to one end of a suction hose having conductors integral therewith, latch means carried by said cup-like member for engaging said receptacle member and thereby removably securing said cup-like member within said receptacle member, and a pair of coaxial slip ring contacts of unequal diameter connected in longitudinally spaced relation on the end of said cup-like member adjacent the free end thereof.

4. An airflow-electric coupling according to claim 3 wherein said dielectric and conductive plungers and said slip ring contacts are cooperatively dimensioned and arranged for connecting said circuit means and said contact means before said switch means is closed when said cup-like member is fully inserted in said receptacle member and said switch means is opened before said conductive plunger is separated from said slip ring contacts.

5. An airflow-electric coupling according to claim 4 wherein said plunger means of conductive material are longer than the plunger means of dielectric material.

6. In a vacuum cleaner, a tank having a suction inlet opening therein for the admission of dirt-ladened air, a hollow body of dielectric material comprising a large diameter tubular conduit, a small diameter tubular conduit coaxial with and axially offset relative to said large diameter conduit and an annular wall extending between both said conduits, said hollow body being arranged in said tank so that the dirt-ladened air entering the suction inlet opening first passes through the large diameter conduit and then through the small diameter conduit, a source of voltage in said tank, a first pair of radially spaced electrical contacts mounted on said annular wall and slidably protruding axially therethrough into the large diameter conduit, a pair of springs mounted on a surface of the annular wall which is exterior of the inside of the large diameter conduit, each spring biasing a different one of said first pair of contacts to positions within said large diameter conduit, said annular wall having defined in the aforesaid exterior surface thereof a pair of cavities, said annular wall having a pair of holes therethrough, each hole communicating a different one of the cavities with the inside of the large diameter conduit, a pair of dielectric rods, each rod being located in a different one of said holes and axially sildably therein, the opposing ends of the rods protruding into the large diameter conduit and into their respective cavities, a pair of normally-open switches, each switch being mounted in a different one of said cavities and closable as said rod protruding into said cavity is slidably moved further into the cavity, each switch being serially connected between said source of voltage and a different one of said first pair of electrical contacts, a pair of dielectric plates, each plate covering a different one of said cavities and the switch therein, a hose, a two-wire electric cord carried by said hose, and a second pair of radially spaced electrical contacts mounted on an end section of said hose, each of the last-mentioned contacts being connected to a different wire in said cord, said end section of the hose being insertable through said suction inlet opening and into said large diameter conduit where said end section slidably moves said dielectric rods further into their respective cavities to close said switches and thereby energize said first pair of contacts with voltage from said source of voltage, each contact of said second pair of contacts engaging a different contact of said first pair of contacts before said switches are closed by their respective rods, said springs biasing said first pair of contacts into engagement with said second pair of contacts until after the switches open when said end section of the hose is being withdrawn from the large diameter conduit.

7. In a vacuum cleaner, a tank having a suction inlet opening therein for the admission of dirt-ladened air, a hollow body comprising a large cross-section conduit, a small cross-section conduit coaxial with and axial offset relative to said large conduit and a wall extending between both said conduits, said hollow body being arranged in said tank so that the dirt-ladened air entering the suction inlet opening first passes through the large conduit and then through the small conduit, a source of voltage in said tank, a first pair of electrical contacts mounted on said wall and located inside the large conduit, a pair of springs mounted on the annular wall, each spring biasing a different one of said first pair of contacts to position within said large conduit, said wall having defined in the surface thereof which is exterior of the inside of the large conduit, a pair of cavities, said wall having a pair of holes therethrough, each hole communicating a different one of the cavities with the inside of the large conduit, a pair of rods, each rod being located in a different one of said holes and axially slidable therein, the opposing ends of the rods protruding into the large conduit and into their respective cavities, a pair of normally-open switches, each switch being mounted in a different one of said cavities and closable as said rod protruding into said cavity is slidably moved further into the cavity, each switch being serially connected between said source of voltage and a different one of said first pair of electrical contacts, a pair of plates, each plate covering a different one of said cavities and the switch therein, a hose, and a second pair of electrical contacts mounted on an end section of sad hose, said end section of the hose being insertable through said suction inlet opening and into said large conduit where said end section slidably moves said rods further into their respective cavities to close said switches and thereby energize said first pair of contacts with voltage from said source of voltage, each contact of said second pair of contacts engaging a different contact of said first pair of contacts before said switches are closed by their respective rods, said springs biasing said first pair of contacts into engagement with said second pair of contacts until after the switches open when said end section of the hose is being withdrawn from the large conduit.

8. In a vacuum cleaner, a tank having a suction inlet opening therein for the admission of dirt-ladened air, a large cross-section conduit, a small cross-section conduit coaxial with and axially offset relative to said large conduit and a wall internally connecting both said conduits, said conduits being arranged in said tank so that the dirt-ladened air entering the suction inlet opening first passes through the large conduit and then through the small conduit, a source of voltage in said tank, a first pair of electrical contacts mounted on said wall and located within the large conduit, said wall having a pair of holes therethrough, each hole communicating a surface of the wall which is exterior of the inside of the large conduit with the inside of the large conduit, a pair of rods, each rod being located in a different one of said holes and axially slidable therein, the opposing ends of the rods protruding into the large conduit from said exterior surface of said wall, a pair of normally-open switches, each switch being mounted on the exterior surface of said wall and closable as said rod protruding from said exterior surface is slidably moved further away from said exterior surface, each switch being serially connected between said source of voltage and a different one of said first pair of electrical contacts, a hose, and a second pair of electrical contacts mounted on an end section of said hose, said end section of the hose the hose being insertable through said suction inlet opening and into said large conduit where said end section slidably moves said rods further away from said exterior surface to close said switches and thereby energize said first pair of contacts with voltage from said source of voltage, each contact of said second pair of contacts engaging a different contact of said first pair of contacts.

9. In a vacuum cleaner, a tank having a suction inlet opening therein for the admission of dirt-ladened air, a hollow body of dielectric material comprising a large inside diameter tubular conduit, a small inside diameter tubular conduit coaxial with an axially offset relative to said large diameter conduit so that a relatively short end section of the small conduit extends into the large conduit and an annular wall extending between both said conduits and defining an annular cylindrical cavity between the inside surface of the large conduit and the outside surface of said short end section of the small conduit, said hollow body being arranged in said tank so that the dirt-ladened air entering the suction inlet opening first passes through the large diameter conduit and then through the small diameter conduit, a source of voltage in said tank, a first pair of radially spaced electrical contacts mounted on said annular wall and slidably protruding axially therethrough into said annular cylindrical cavity, a pair of springs mounted on a surface of the annular wall which is exterior of the inside of the large diameter conduit and said annular cylindrical cavity, each spring biasing a different one of said first pair of contacts to positions within said annular cylindrical cavity, said annular wall having defined in the aforesaid exterior surface of the annular wall a pair of cavities, said annular wall having a pair of holes therethrough, each hole communicating a different one of the cavities with the annular cylindrical cavity, a pair of dielectric rods, each rod being located in a different one of said holes and axially slidable therein, the opposing ends of the rods protruding into the annular cylindrical cavity and into their respective cavities, a pair of normally-open switches, each switch being mounted in a different one of said cavities and closable as said rod protruding into said cavity is slidably moved further into the cavity, each switch being serially connected between said source of voltage and a different one of said first pair of electrical contacts, a pair of dielectric plates, each plate covering a different one of said cavities and the switch therein, a hose, a two-wire electric cord carried by said hose, and a second pair of radially spaced electrical contacts mounted on an end section of said hose, each of the last-mentioned contacts being connected to a different wire in said cord, said end section of the hose being insertable through said suction inlet opening into said large diameter conduit and into said annular cylindrical cavity where said end section slidably moves said dielectric rods further into their respective cavities to close said switches and thereby energize said first pair of contacts with voltage from said source of voltage, each contact of said second pair of contacts engaging a different contact of said first pair of contacts before said switches are closed by their respective rods, said springs biasing said first pair of contacts into engagement with said second pair of contacts until after the switches open when said end section of the hose is being withdrawn from the large diameter conduit.

References Cited

UNITED STATES PATENTS 2,072,690  3/1937  Smellie.
2,877,313  3/1959  Stoicos _____ 15—314 X ROBERT W. MICHELL, *Primary Examiner.*